F. W. DODD.
DRIVING MECHANISM FOR SELF PROPELLED BODIES.
APPLICATION FILED MAR. 21, 1913.
1,216,664.
Patented Feb. 20, 1917.
2 SHEETS—SHEET 2.
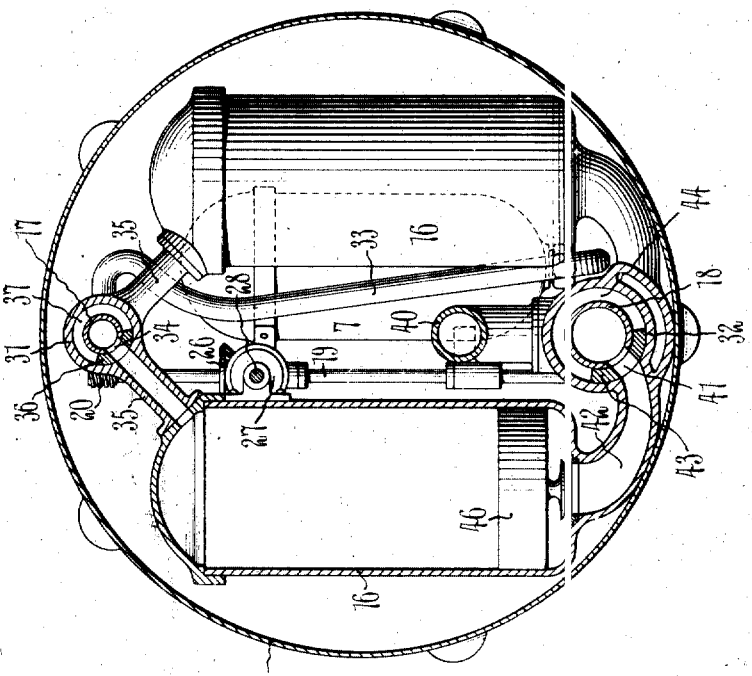

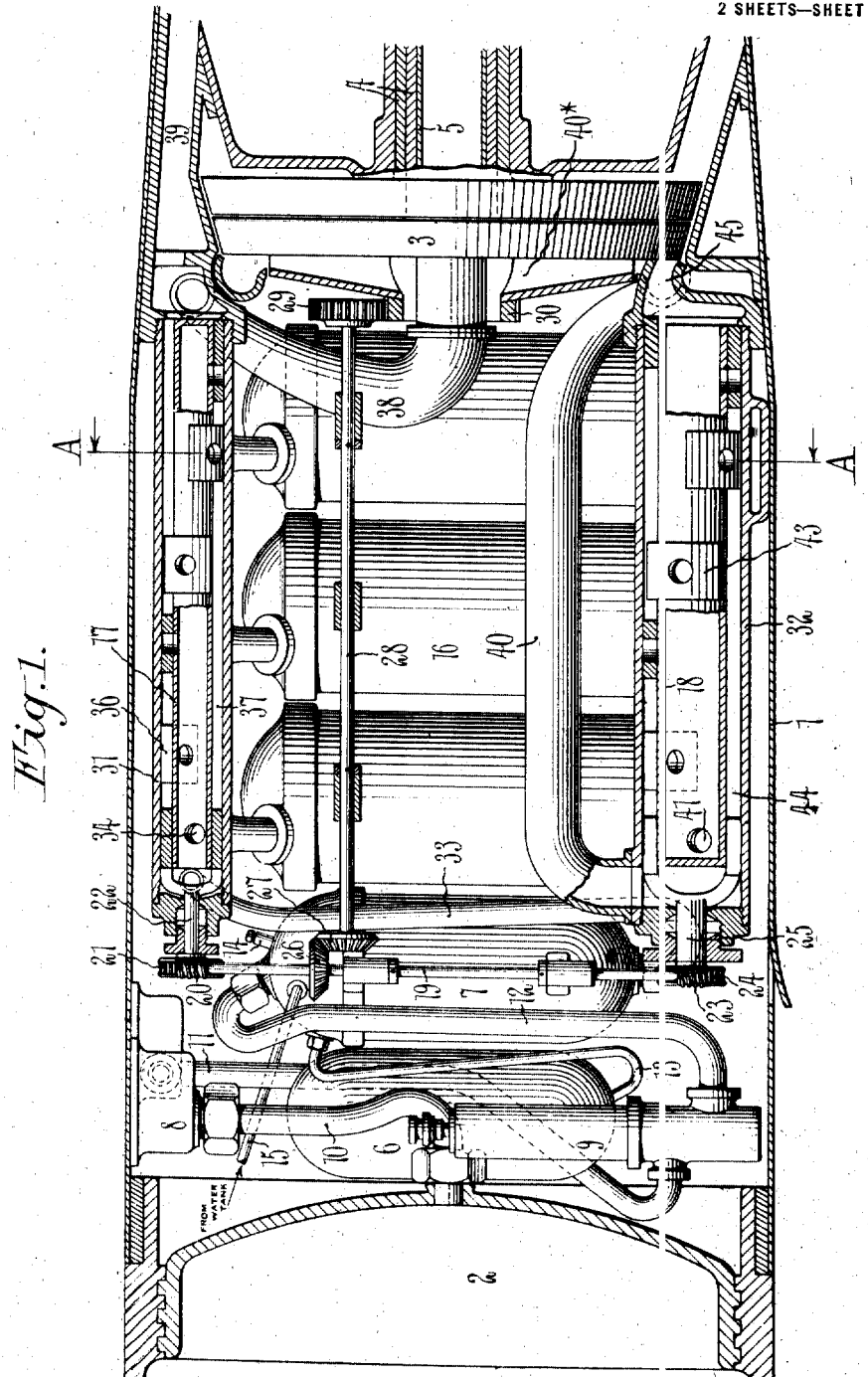

UNITED STATES PATENT OFFICE.

FRANK W. DODD, OF BROOKLYN, NEW YORK.

DRIVING MECHANISM FOR SELF-PROPELLED BODIES.

1,216,664.   Specification of Letters Patent.   Patented Feb. 20, 1917.

Application filed March 21, 1913. Serial No. 755,905.

*To all whom it may concern:*

Be it known that I, FRANK W. DODD, a subject of the Crown of Great Britain, and resident of the borough of Brooklyn, in the city and State of New York, have invented a new and useful Improvement in Driving Mechanism for Self-Propelled Bodies, of which the following is a specification.

This invention consists in a novel driving mechanism for self-propelled bodies and is particularly well adapted for use in connection with automobile torpedoes.

One object of this invention is to attain greater economy and efficiency in the conversion of motive power into useful work in driving mechanisms which have heretofore suffered from various disadvantages and power losses when put into actual practice, as will be hereinafter further pointed out.

A further object is to avoid the complication, liability to break down and excessive weight of a driving mechanism including reciprocating engines or to obviate the inefficiency and inconvenient high speed incidental to the use of turbine engines utilizing an elastic or gaseous fluid as their motive power.

This invention is more particularly directed to that class of driving mechanism in which a heated fluid, such as compressed air, is utilized for driving an engine. Such heated fluid has heretofore been used in driving reciprocating engines in which the expansion of the fluid was utilized and for driving the turbine engines in which the velocity, reaction and expansion of the fluid was utilized.

When such systems were employed for the propulsion of bodies such, for example, as automobile torpedoes, the propeller shaft could be driven directly from the reciprocating engine but the temperature of the fluid could not exceed a certain maximum degree which was comparatively low because of the overheating of the parts.

In the case of the turbine engine, a reducing gear was generally found necessary and while higher temperatures could be used than in the case of the reciprocating engine, still the maximum degree of heat permissible was still far below the degree which is desirable theoretically for the best results.

Moreover, the speed of the turbine engine although comparatively high could not, for practical reasons, be such as to enable the greatest possible efficiency to be obtained even when complicated speed reducing gearing between the turbine engine and the propeller shaft was employed.

In this present invention the heated or hot pressure fluid, which may be compressed air, is not admitted directly to the engine but is first caused to act upon a suitable liquid such as water for forcing the water through the engine.

One embodiment of my invention is represented in the accompanying drawings, in which—

Figure 1 represents in longitudinal central section so much of an automobile torpedo as will give a clear understanding of my invention, and Fig. 2 is a transverse section taken in the plane of the line A—A of Fig. 1.

The torpedo shell is denoted by 1. The reservoir for the pressure fluid, in the present instance compressed air, is denoted by 2. The engine is denoted by 3, which engine, in the present instance, is shown as a liquid driven turbine engine.

The propeller shafts, driven by the engine, are denoted by 4, which shafts surround a hollow sleeve 5 which is herein used as an axially arranged exhaust conduit.

The liquid fuel reservoir is denoted by 6; the combustion tank or superheater by 7; the starting valve by 8; and the pressure reducing valve by 9.

A pipe 10 leads from the compressed air reservoir 2 to the starting valve 8. A pipe 11 leads from the starting valve 8 to the pressure reducing valve 9 and a pipe 12 leads from the reducing valve 9 to the combustion tank 7.

A pipe 13 leads from the liquid fuel reservoir 6 to the combustion tank 7. The igniter for the combustion tank is denoted by 14. Water is supplied in relatively small quantities to the combustion tank 7 from a water tank, not shown, through a pipe 15.

A container is provided, which container is arranged to receive a liquid, such as water, from a liquid supply and to also receive a charge of pressure fluid from the combustion tank 7 whereby the liquid is forced from the tank through the engine.

In the present instance I have shown six of these containers 16 arranged in two rows of three each. The admission and exhaust of the pressure fluid and the admission and discharge of the liquid may be controlled by any suitable valve mechanism. In the present instance I have shown a rotary valve 17 for controlling the admission and exhaust of the pressure fluid and a rotary valve 18 for controlling the admission and discharge of the liquid, which valves are driven from the engine to operate at the proper times through the following mechanism: A vertically arranged shaft 19 has a worm and gear connection 20, 21, with the stem 22 of the valve 17 and a worm and gear connection 23, 24, with the stem 25 of the valve 18. This shaft 19 has a geared connection 26, 27, with a shaft 28, which shaft 28 has a geared connection 29, 30, with the engine 3.

The chest for the valve 17 is denoted by 31 and the chest for the valve 18 is denoted by 32.

The interior of the valve 17 is in open communication with the interior of the combustion tank 7 through a pipe 33 and the said valve 17 is provided with a series of inlet ports 34 arranged to be successively brought into communication with the inlet pipes 35 of the liquid containers 16 by the rotary movement of the said valve 17.

The valve segments 36 through which the ports 34 extend are so arranged that at the proper intervals the interiors of the containers are brought into open communication with the space 37 between the valve and the valve chest for exhausting the pressure fluid successively from the said containers after the pressure fluid has forced the water from the containers, as will hereinafter appear.

The exhaust gases escaping from the containers may pass through the pipe 38 through the center of the engine 3 to the interior of the sleeve 5 or the gases may pass out through the exhaust passage 39.

The interior of the valve 18 may be supplied with liquid from any suitable source. In the present instance, the water is taken into the interior of the valve 18 through a pipe 40. The inlet mouth of this pipe 40 is arranged in position to receive the water from a centrifugal pump 40* mounted on the axis of the engine 3. This pump assists in the proper and rapid supply of water through the pipe 40 for the reason that the pump increases to a material degree the water pressure due to the speed of the torpedo through the body of water, the water entering the power chamber (the chamber containing the motive power installation), for example through the opening 40*. This valve 18 is provided with a series of ports 41 arranged to be brought successively into communication with the liquid pipes 42 leading to the containers 16. The segments 43 through which the ports 41 lead are so designed that the water will be discharged at proper intervals from the tanks 16 by the pressure of the pressure fluid into the space 44 between the valve 18 and the chest 32 and from thence out through a suitable nozzle 45 into engagement with the engine 3.

When this invention is used in connection with automobile torpedoes the forward movement of the same will cause the containers to be filled with water when open to the interior of the valve 18.

Each of the tanks 16 may be provided with a float valve 46 for automatically closing the pipe 42 to prevent the escape of pressure fluid therethrough. This valve also prevents the churning up of the liquid when the pressure fluid is first admitted into the container. It is intended that this valve should close before the container is quite emptied. The reason I have shown a series of containers 16 is that the pressure of the water supply will generally be very far below the pressure of the pressure fluid admitted to the containers for expelling the water and considerably more time would be occupied in filling the container than in emptying it. Therefore, it is possible, by employing a number of containers, to procure a rapid and almost continuous expulsion of the water from the nozzle and thus secure a perfectly uniform and steady torque from the engine.

By the use of my invention it will be seen that the engine may be driven at a comparatively low speed with a high percentage of efficiency and the speed may be so low that it will be possible, in many instances to connect the engine directly to the driving wheel or propeller and thus dispense with speed reducing gearing.

It will also be seen that another advantageous result is accomplished in that the higher temperature fluid does not come into contact with the engine and it is therefore impossible for parts of the engine to become overheated or burned from such contact.

While I have shown and described one valve mechanism for successfully controlling the admission and exhaust of the pressure fluid and the admission and discharge of the liquid, still it is to be understood that I do not wish to confine myself to such particular valve mechanism but contemplate the use of any mechanism suitable for carrying out the invention, the mechanism shown and described being only one of various mechanisms which could be readily employed.

What I claim is:—

1. An automobile torpedo and a driving mechanism therefor comprising an engine arranged to be driven by the water in which the torpedo is immersed or on which it floats, and fluid pressure means operated by expansion of gas derived from a source or reservoir kept at continuous pressure for forcing the water through the engine, the water after passing through the engine being exhausted into the surrounding water in a rearward direction.

2. An automobile torpedo and a driving mechanism therefor comprising a turbine engine arranged to be driven by the water in which the torpedo is immersed or on which it floats, and fluid pressure means operated by expansion of gas derived from a source or reservoir kept at continuous pressure for forcing the water through the engine, the water after passing through the engine being exhausted into the surrounding water in a rearward direction.

3. An automobile torpedo and a driving mechanism therefor comprising an engine, a container arranged to receive the water in which the torpedo is immersed or on which it floats, and pressure fluid means operated by expansion of gas derived from a source or reservoir kept at continuous pressure for forcing the water from the container through the engine, the water after passing through the engine being exhausted into the surrounding water in a rearward direction.

4. An automobile torpedo and a driving mechanism therefor comprising a turbine engine, a container arranged to receive the water in which the torpedo is immersed or on which it floats, and pressure fluid means operated by expansion of gas derived from a source or reservoir kept at continuous pressure for forcing the water from the container through the engine, the water after passing through the engine being exhausted into the surrounding water in a rearward direction.

5. An automobile torpedo and a driving mechanism therefor comprising an engine, a plurality of containers arranged to receive the water in which the torpedo is immersed or on which it floats, and fluid pressure means operated by expansion of gas derived from a source or reservoir kept at continuous pressure for forcing the water from the containers through the engine, the water after passing through the engine being exhausted into the surrounding water in a rearward direction.

6. An automobile torpedo and a driving mechanism therefor comprising a turbine engine, a plurality of containers arranged to receive the water in which the torpedo is immersed or on which it floats, and fluid pressure means operated by expansion of gas derived from a source or reservoir kept at continuous pressure for forcing the water from the containers through the engine, the water after passing through the engine being exhausted into the surrounding water in a rearward direction.

7. An automobile torpedo and a driving mechanism therefor comprising an engine, a container, means for filling the container with the water in which the torpedo is immersed or on which it floats, by the movement of the torpedo through the water, and pressure fluid means operated by expansion of gas derived from a source or reservoir kept at continuous pressure for forcing the water from the container through the engine, the water after passing through the engine being exhausted into the surrounding water in a rearward direction.

8. An automobile torpedo and a driving mechanism therefor comprising a turbine engine, a container, means for filling the container with the water in which the torpedo is immersed or on which it floats, by the movement of the torpedo through the water, and pressure fluid means operated by expansion of gas derived from a source or reservoir kept at continuous pressure for forcing the water from the container through the engine, the water after passing through the engine being exhausted into the surrounding water in a rearward direction.

9. An automobile torpedo and a driving mechanism therefor comprising an engine, a plurality of containers, means for filling the containers with the water in which the torpedo is immersed or on which it floats, by the movement of the torpedo through the water, and pressure fluid means operated by expansion of gas derived from a source or reservoir kept at continuous pressure for forcing the water from the containers through the engine, the water after passing through the engine being exhausted into the surrounding water in a rearward direction.

10. An automobile torpedo and a driving mechanism therefor comprising a turbine engine, a plurality of containers, means for filling the containers with the water in which the torpedo is immersed or on which it floats, by the movement of the torpedo through the water, and pressure fluid means operated by expansion of gas derived from a source or reservoir kept at continuous pressure for forcing the water from the containers through the engine, the water after passing through the engine being exhausted into the surrounding water in a rearward direction.

11. An automobile torpedo and a driving mechanism therefor comprising an engine, a container, means for forcing the water in which the torpedo is immersed or on which it floats, into the container, and pressure fluid means operated by expansion of gas derived from a source or reservoir kept at continuous pressure for forcing the water from the container through the engine, the water after passing through the engine being exhausted into the surrounding water in a rearward direction.

12. An automobile torpedo and a driving mechanism therefor comprising a turbine engine, a container, means for forcing the water in which the topedo is immersed or on which it floats, into the container, and pressure fluid means operated by expansion of gas derived from a source or reservoir kept at continuous pressure for forcing the water from the container through the engine, the water after passing through the engine being exhausted into the surrounding water in a rearward direction.

13. An automobile torpedo and a driving mechanism therefor including an engine, a plurality of containers, means for forcing the water in which the torpedo is immersed or on which it floats, into said containers, and pressure fluid means operated by expansion of gas derived from a source or reservoir kept at continuous pressure for forcing the water from the containers through the engine, the water after passing through the engine being exhausted into the surrounding water in a rearward direction.

14. An automobile torpedo and a driving mechanism therefor including a turbine engine, a plurality of containers, means for forcing the water in which the torpedo is immersed or on which it floats, into said containers, and pressure fluid means operated by expansion of gas derived from a source or reservoir kept at continuous pressure for forcing the water from the containers through the engine, the water after passing through the engine being exhausted into the surrounding water in a rearward direction.

15. An automobile torpedo and a driving mechanism therefor comprising an engine, a container, means driven by the engine for forcing the water in which the torpedo is immersed or on which it floats, into the container, and pressure fluid means operated by expansion of gas derived from a source or reservoir kept at continuous pressure for forcing the water from the container through the engine, the water after passing through the engine being exhausted into the surrounding water in a rearward direction.

16. An automobile torpedo and a driving mechanism therefor comprising a turbine engine, a container, means driven by the engine for forcing the water in which the torpedo is immersed, or on which it floats, into the container, and pressure fluid means operated by expansion of gas derived from a source or reservoir kept at continuous pressure for forcing the water from the container through the engine, the water after passing through the engine being exhausted into the surrounding water in a rearward direction.

17. An automobile torpedo and a driving mechanism therefor comprising an engine, a plurality of containers, means driven by the engine for forcing the water in which the torpedo is immersed or on which it floats, into said containers, and pressure fluid means operated by expansion of gas derived from a source or reservoir kept at continuous pressure for forcing the water from the containers through the engine, the water after passing through the engine being exhausted into the surrounding water in a rearward direction.

18. An automobile torpedo and a driving mechanism therefor comprising a turbine engine, a plurality of containers, means driven by the engine for forcing the water in which the torpedo is immersed or on which it floats, into said containers, and pressure fluid means operated by expansion of gas derived from a source or reservoir kept at continuous pressure for forcing the water from the containers through the engine, the water after passing through the engine being exhausted into the surrounding water in a rearward direction.

19. An automobile torpedo or other vessel and a driving mechanism therefor comprising an engine, a container, means for filling the container with the water in which the vessel is immersed or on which it floats, pressure fluid means for forcing the water from the container through the engine, and a float valve in the container for preventing the escape of the pressure fluid means with the water.

20. An automobile torpedo or other vessel and a driving mechanism therefor comprising a turbine engine, a container, means for filling the container with the water in which the vessel is immersed or on which it floats, pressure fluid means for forcing the water from the container through the engine, and a float valve in the container for preventing the escape of the pressure fluid means with the water.

21. An automobile torpedo or other vessel and a driving mechanism therefor comprising an engine, a plurality of containers, means for filling the containers with the water in which the vessel is immersed or on which it floats, pressure fluid means for forcing the water from the containers through the engine, and float valves in the containers for preventing the escape of the pressure fluid means with the water.

22. An automobile torpedo or other vessel and a driving mechanism therefor comprising a turbine engine, a plurality of containers, means for filling the containers with the water in which the vessel is immersed or on which it floats, pressure fluid means for forcing the water from the containers through the engine, and float valves in the containers for preventing the escape of the pressure fluid means with the water.

23. An automobile torpedo or other vessel and a driving mechanism therefor comprising an engine, a container having one opening for both the admission and discharge of the water in which the vessel is immersed or on which it floats, and another opening for both the admission and exhaust of a pressure fluid means, said pressure fluid means serving to force the water from the container through the engine.

24. An automobile torpedo or other vessel and a driving mechanism therefor comprising a turbine engine, a container having one opening for both the admission and discharge of the water in which the vessel is immersed or on which it floats, and another opening for both the admission and exhaust of a pressure fluid means, said pressure fluid means serving to force the water from the container through the engine.

25. An automobile torpedo or other vessel and a driving mechanism therefor comprising an engine, a container having one opening for both the admission and discharge of the water in which the vessel is immersed or on which it floats, another opening for both the admission and exhaust of a pressure fluid means, said pressure fluid means serving to force the water from the container through the engine, and valve mechanisms operated by the engine for controlling the said water and pressure fluid openings.

26. An automobile torpedo or other vessel and a driving mechanism therefor comprising a turbine engine, a container having one opening for both the admission and discharge of the water in which the vessel is immersed or on which it floats, another opening for both the admission and exhaust of a pressure fluid means, said pressure fluid means serving to force the water from the container through the engine, and valve mechanisms operated by the engine for controlling the said water and pressure fluid openings.

27. An automobile torpedo or other vessel and a driving mechanism therefor comprising an engine, a plurality of containers each having an opening for both the admission and discharge of the water in which the vessel is immersed or on which it floats, another opening for both the admission and exhaust of a pressure fluid means, said pressure fluid means serving to force the water from the containers through the engine.

28. An automobile torpedo or other vessel and a driving mechanism therefor comprising a turbine engine, a plurality of containers each having an opening for both the admission and discharge of the water in which the vessel is immersed or on which it floats, another opening for both the admission and exhaust of a pressure fluid means, said pressure fluid means serving to force the water from the containers through the engine.

29. An automobile torpedo or other vessel and a driving mechanism therefor comprising an engine, a plurality of containers each having an opening for both the admission and discharge of the water in which the vessel is immersed or on which it floats, another opening for both the admission and exhaust of a pressure fluid means, said pressure fluid means serving to force the water from the containers through the engine, and valve mechanisms operated by the engine for controlling the said water and pressure fluid openings of the several containers.

30. An automobile torpedo or other vessel and a driving mechanism therefor comprising a turbine engine, a plurality of containers each having an opening for both the admission and discharge of the water in which the vessel is immersed or on which it floats, another opening for both the admission and exhaust of a pressure fluid means, said pressure fluid means serving to force the water from the containers through the engine, and valve mechanisms operated by the engine for controlling the said water and pressure fluid openings of the several containers.

In testimony that I claim the foregoing as my invention, I have signed my name in presence of two witnesses, this eighteenth day of March 1913.

FRANK W. DODD.

Witnesses:
F. GEORGE BARRY,
C. S. SUNDGREN.